(12) United States Patent
Canard

(10) Patent No.: US 6,826,934 B2
(45) Date of Patent: Dec. 7, 2004

(54) MOTOR VEHICLE ANTITHEFT SYSTEM COMPRISING IMPROVED LATCH BOLT RETAINING MEANS

(75) Inventor: Louis Canard, Nevers (FR)

(73) Assignee: Valeo Securite Habitacle, Creteil (FR)

(*) Notice: Subject to any disclaimer, the term of this patent is extended or adjusted under 35 U.S.C. 154(b) by 246 days.

(21) Appl. No.: 09/826,348

(22) Filed: Apr. 5, 2001

(65) Prior Publication Data

US 2002/0092332 A1 Jul. 18, 2002

(30) Foreign Application Priority Data

Apr. 10, 2000 (FR) .......................................... 00 04550

(51) Int. Cl.⁷ .............................................. B60R 25/02
(52) U.S. Cl. ............................. 70/186; 70/181; 70/182; 70/183; 70/184; 70/185; 70/187; 70/252
(58) Field of Search .......................... 70/181, 182, 183, 70/184, 185, 186, 187, 252

(56) References Cited

U.S. PATENT DOCUMENTS

| | | | | |
|---|---|---|---|---|
| 3,840,714 A | * | 10/1974 | Arman | 180/78 |
| 5,255,547 A | * | 10/1993 | Burr et al. | 70/252 |
| 5,398,532 A | * | 3/1995 | Janssen et al. | 307/10.2 |
| 5,848,540 A | * | 12/1998 | Pieper | 70/252 |
| 6,035,675 A | * | 3/2000 | Zimmer et al. | 70/186 |
| 6,076,382 A | * | 6/2000 | Naganuma | 70/186 |
| 6,155,089 A | * | 12/2000 | Hurskainen et al. | 70/187 |

FOREIGN PATENT DOCUMENTS

| | | | |
|---|---|---|---|
| GB | 2298229 | 8/1996 | |
| GB | 2298229 A1 | * 8/1996 | ............ E05B/17/04 |
| GB | 2298229 A | * 8/1996 | ............ E05B/17/04 |

* cited by examiner

Primary Examiner—Anthony Knight
Assistant Examiner—Christopher Boswell
(74) Attorney, Agent, or Firm—Liniak, Berenato & White

(57) ABSTRACT

The invention provides a motor vehicle antitheft system of the type in which the latch bolt (36, 222) is held radially in the pulled-in retracted position by a member (254) for retaining the latch bolt (36, 222) which is mounted to move between an effaced or retracted position and an active latch bolt retaining position toward which it is elastically urged (262) and in which a retaining finger (252) belonging to the latch bolt retaining member (254) is accommodated in a complementary notch (250) of the latch bolt, wherein the member (254) for retaining the latch bolt (36, 222) is mounted to slide in the housing of the antitheft system (52, 54) parallel to the axis (A) of displacement and of rotation of a manual control member (24, 26, 38), and wherein the finger (252) for retaining the latch bolt (36, 222) is formed at the front free end of the latch bolt retaining member.

17 Claims, 12 Drawing Sheets

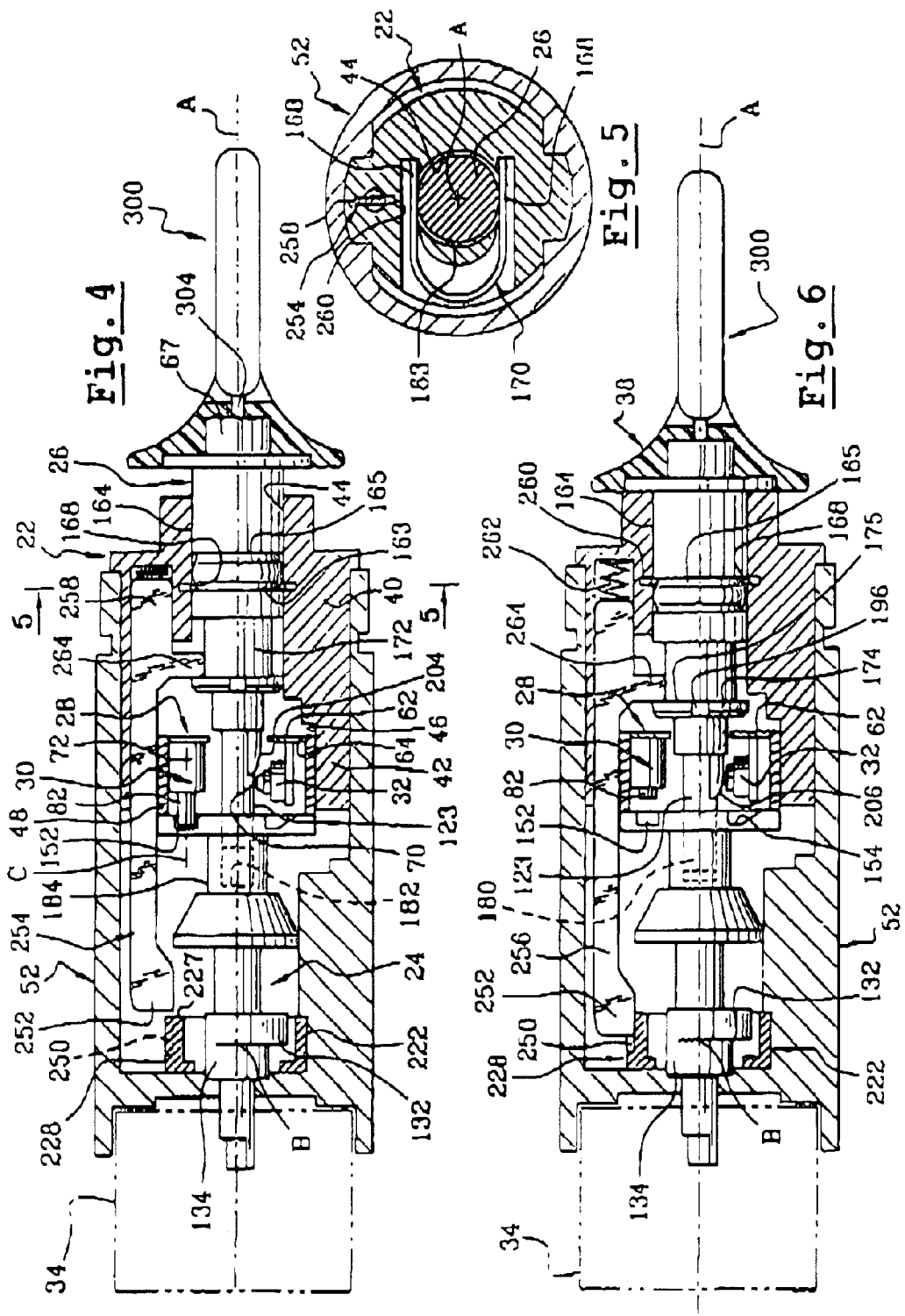

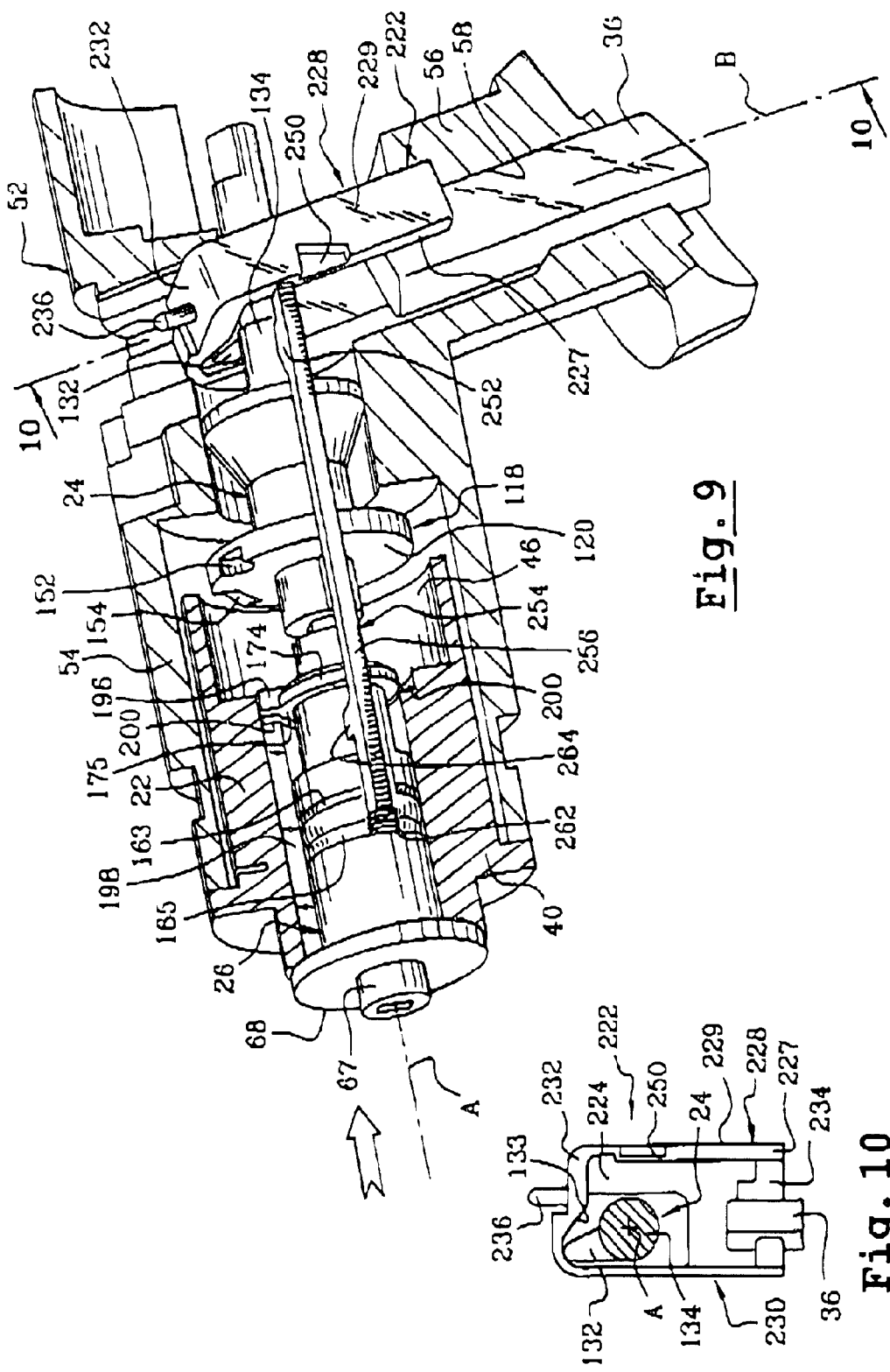

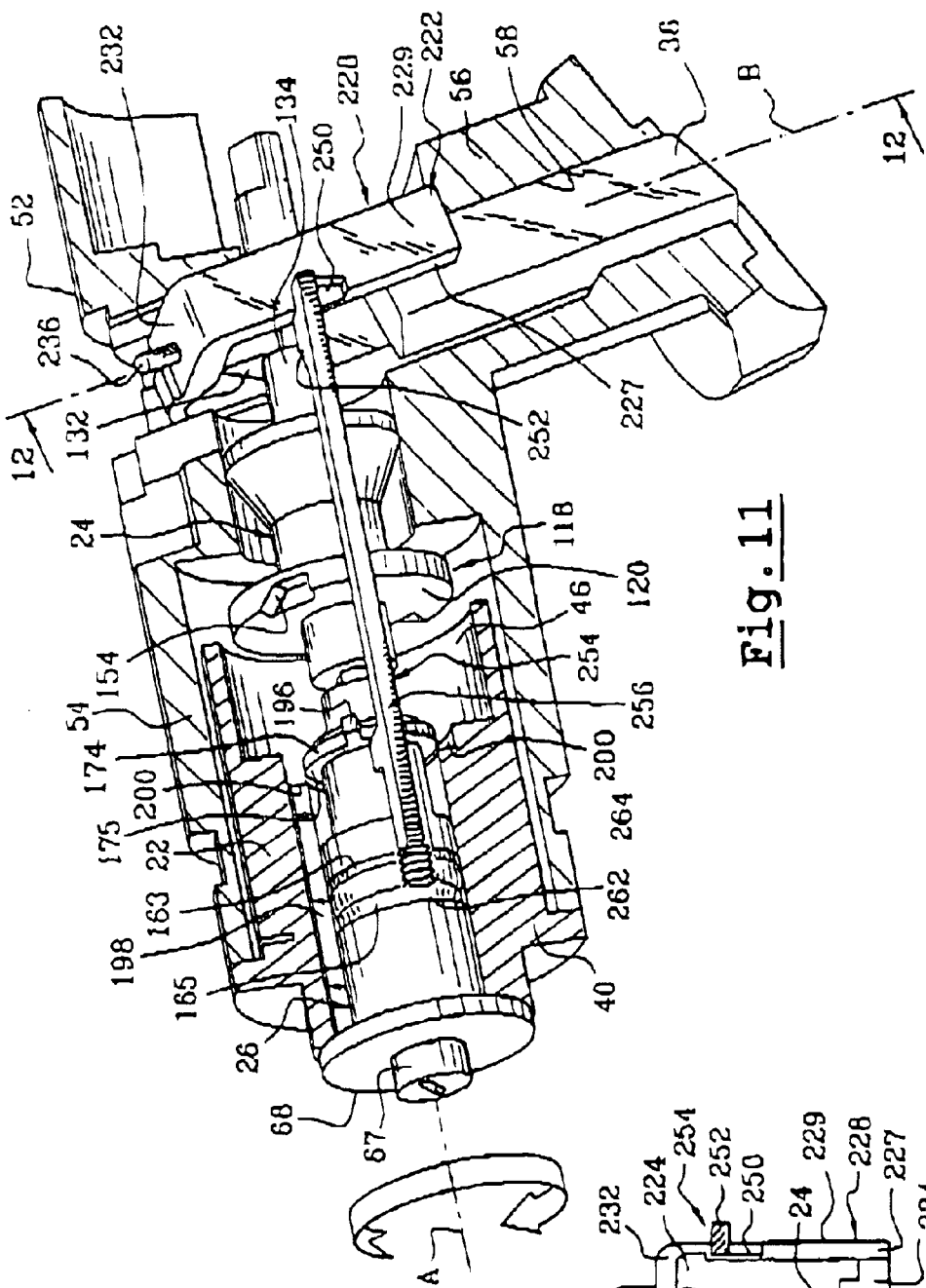
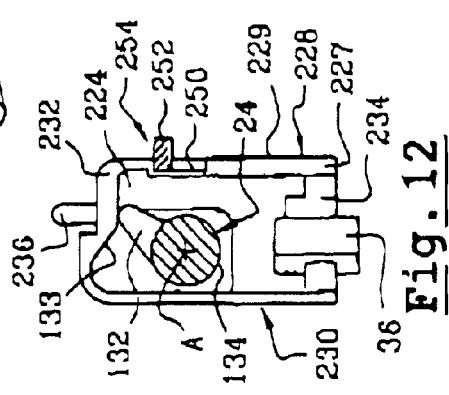
Fig. 11
Fig. 12

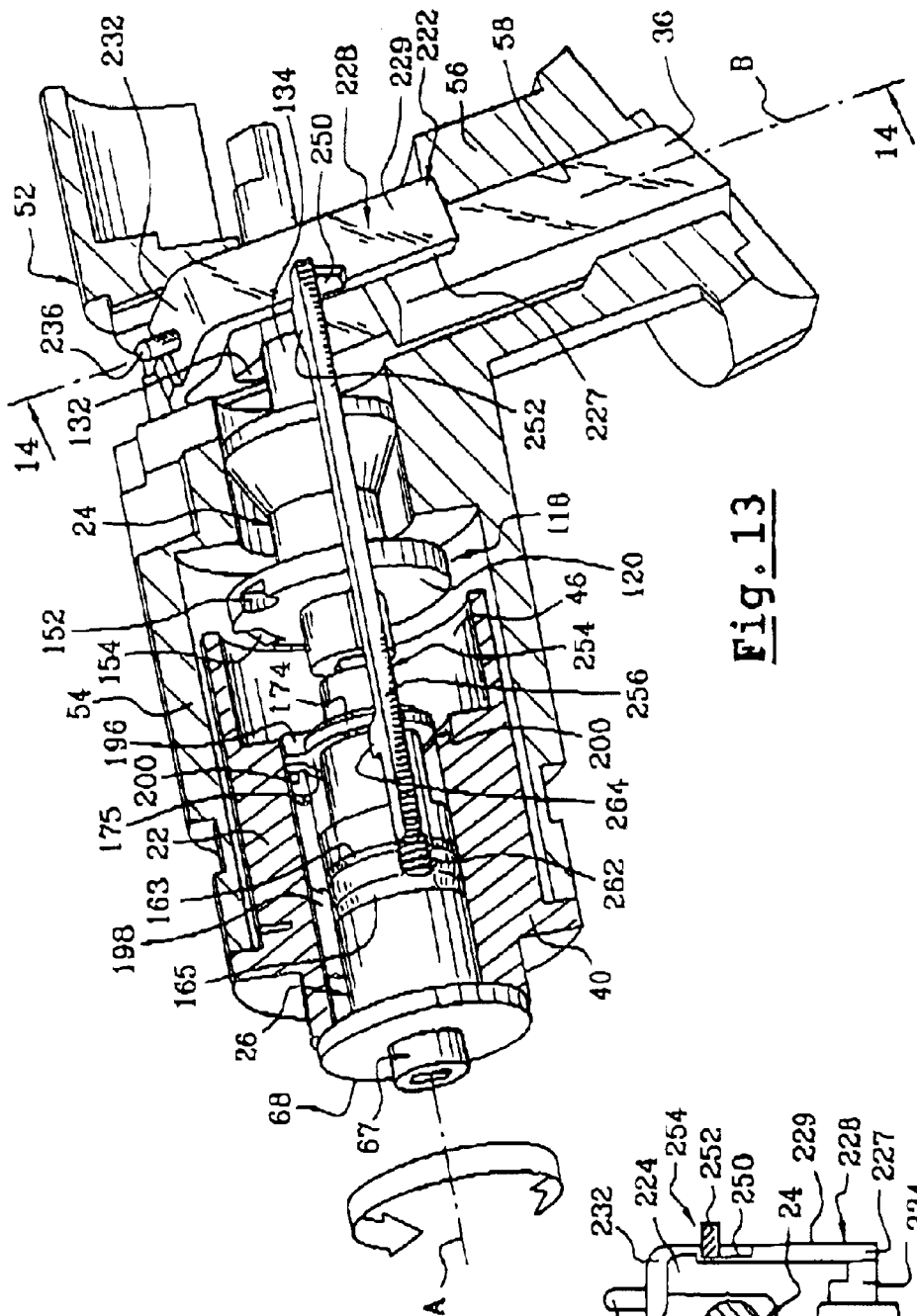
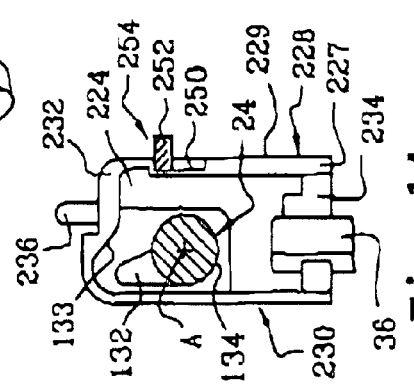
Fig. 13
Fig. 14

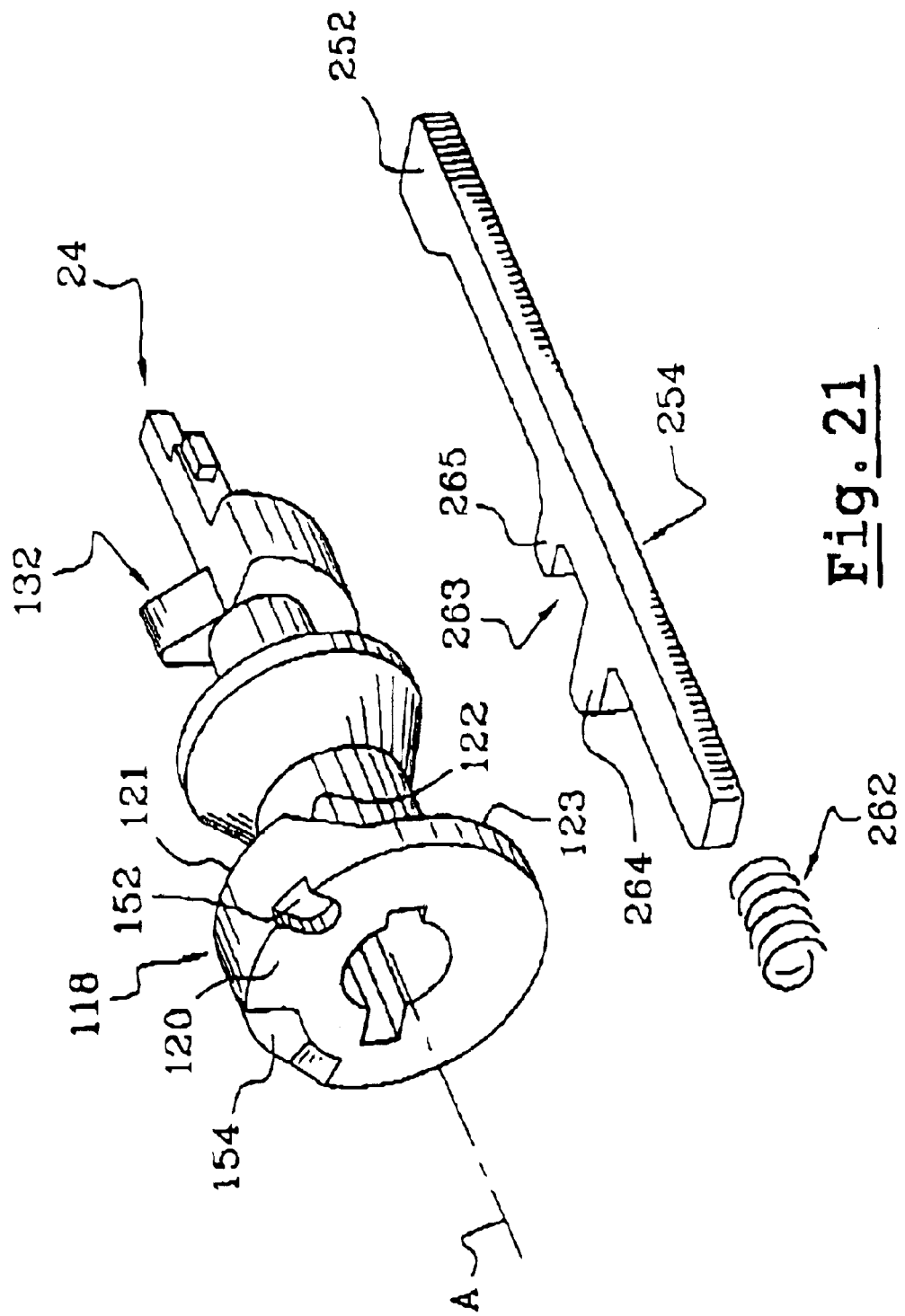

MOTOR VEHICLE ANTITHEFT SYSTEM COMPRISING IMPROVED LATCH BOLT RETAINING MEANS

The present invention relates to a motor vehicle steering antitheft system.

The invention relates more specifically to a motor vehicle steering antitheft system.

Various designs are known in which the antitheft system comprises a housing in which a member, particularly a key, for manually controlling the starting of the vehicle engine and the locking of the vehicle steering column is inserted and is used in order, or the one hand, to unlock, or release, one shaft of the vehicle steering column in terms of rotation and, on the other hand, to control the starting of the engine and, conversely, to stop the engine and to lock or immobilize the steering column shaft again.

More particularly, the manual control member is mounted so that it can move axially between a pulled back position in which it locks the steering column and a pushed forward position in which it unlocks the steering column.

It is mounted so that it can rotate between at least one angular position of rest and an angular position of use, for example of starting or operating the engine, in which, so as to avoid accidentally immobilizing the steering column during use, particularly when the vehicle is traveling along, it cannot be pulled axially back.

The manual control member is connected in terms of rotation to a rotary output member forming a cam which is capable of collaborating with a latch bolt to control the movements of the latter which is mounted to slide in the housing in a direction which is radial overall with respect to the axis of rotation of the manual control member between a deployed radially outward antitheft position toward which it is elastically urged and in which it projects through an opening of the housing to immobilize in terms of rotation one member of the steering column when the control member is in the angular position of rest and in the pulled back locked position, and a pushed-in position retracted inside the housing.

Finally, the manual control member is connected in terms of rotation to a multi-position switch/interrupter assembly for powering various corresponding electrical circuits, of which there are usually four, and which include, in succession, a "STOP" position (corresponding to the extreme angular position of rest of the manual control member), a "+ACCESSORIES" position, a "+ CONTACT" position and a "START" position (corresponding to the other opposite extreme angular position).

In what is known as a "mechanical" design of such an antitheft system, the manual control member is a key, the shank of which is accommodated axially in the barrel of a lock which, when the key is the right key, allows an output rotor to be turned to control the antitheft latch bolt and the multi-position rotary interrupter.

Successive evolutions in such a type of antitheft system have culminated in particularly reliable and compact designs, it being possible for the entire antitheft mechanism with its lock to be housed, in particular, as a single unit in a tube adjacent to the steering column.

However, it has also been found that it is desirable for certain vehicles to be fitted with more reliable antitheft systems known as "secure" systems, while at the same time improving the convenience of use and in particular the ergonomics of manipulation while at the same time meeting the standards, which entails resorting to a manual control member that can move axially and in terms of rotation in order to carry out the aforementioned maneuvering cycles.

In an "electronic" antitheft system of this type, the coding of the antitheft system is no longer obtained by the matching of the right key with a barrel-type lock, but is obtained by means of an electronic identification device which, in particular, comprises an electronic identifier belonging to the authorized user and a unit for identifying an authorized user of the vehicle, fitted on board the vehicle, and which supplies an encoded antitheft signal when the correct identifier is recognized.

The electronic device is of the type known as the "hands-free" type when all the interrogation and recognition or identification steps are performed without the user having to perform any maneuvre or any particular action other than those which allow him to enter the vehicle.

It may also be of the type in which the user has possession of an identifier in the form of a badge which he introduces manually into a housing on board the vehicle.

Designs have thus been proposed in which the manual member or controlling the antitheft mechanism is a control knob replacing the key and which is permanently on the vehicle.

According to the legislation, the immobilization or release of the steering column shaft need to be brought about by an axial displacement of the operating knob.

In general, the ergonomics needs to be the same, from the user's point of view, as those of a "mechanical" antitheft system to which he may have become accustomed, and in which introducing the key into the lock then starting to turn it corresponds to an identification step.

Whether the antitheft system be of the "mechanical" type or of the "electronic" type, it needs to have means of holding the latch bolt in the pulled in or retracted position which are perfectly reliable so as to eliminate any risk of accidental immobilization of the steering column shaft while the vehicle is in use, particularly while it is traveling along.

Various designs are thus known whereby the latch bolt is, held radially in the pulled in retracted position by a latch bolt retaining member which is mounted so that it can move between an effaced or retracted position and an active latch bolt retaining position toward which it is elastically urged and in which a retaining finger belonging to the retaining member is accommodated in a complementary notch in the latch bolt.

The general desire of motor vehicle manufacturers, to standardize components and equipment within a range of vehicles and for various versions of the same model culminates in particular in the standardization of the overall design of the steering column and of its antitheft mechanism and, more particularly, the design of the cam/latch bolt/interrupter electromechanical assembly which in addition complies with a set of legal standards which further complicate its design and homologation.

The invention thus aims to provide a novel design of latch bolt retaining means which can be used both for a mechanical antitheft system and for an electronic antitheft system, which is reliable, and the size of which is particularly small.

In order to remedy these drawbacks, the invention proposes an antitheft system of the aforementioned type, wherein the member for retaining the latch bolt is mounted to slide in the housing parallel to the axis of displacement and of rotation of the manual control member, and wherein the finger for retaining the latch bolt is formed at the front free end of the latch bolt retaining member.

The design according to the invention particularly lends itself to being adapted to suit an electronic antitheft system in which the manual control member is overall in the form of a manual control knob which is connected in terms of axial translation and in terms of rotation to a control rod, the displacements of which, with respect to the housing of the antitheft system, are similar to the displacements of the shank of a mechanical key with respect to the stator of the barrel-type lock that accommodates it.

According to other features of the invention:

the displacement of the latch bolt retaining member toward its effaced rear axial position against its return spring is controlled by the backward axial displacement of the manual control member into its pulled back locked position;

a portion of the latch bolt located inside the housing has a transverse rear face in which the latch bolt retaining notch is formed which is open axially toward the rear and on which the finger for retaining the latch bolt car be accommodated;

when the steering column is in the locked position, She front free end of the latch bolt retaining member extends facing the rear transverse face;

the antitheft system comprises elastically deformable means for axially indexing the manual control member in its pulled back locked position and for retaining it in this position against the return force exerted on the latch bolt retaining member by its return spring;

the manual control member comprises a radial flange, the rear annular face of which collaborates with a control tab of the latch bolt retaining member which extends radially inward facing this annular face;

the manual control member has a tab for axially retaining the manual control member with respect to the housing that forms a stator, which extends radially outward from the peripheral edge of the flange and which is accommodated in axial sliding in a complementary slot belonging to the housing to allow the axial displacements of the manual control member between its two axial positions, namely its pulled back locked position and its pushed forward unlocked position;

the antitheft system comprises:

a motorized member, particularly an electromagnetic member, for immobilizing in terms of rotation the control member with respect to the housing and the release of which is brought about when a coded antitheft signal is furnished by an identification unit to an electronic circuit for controlling the immobilization member;

and a switch for initiating an interrogation and identification step, which is carried by the housing and which is initiated by the manual control member;

the manual control member comprises a front rotor which is mounted to rotate with respect to the housing forming a stator between two extreme angular positions, one of which corresponds to the angular position of rest, which controls the displacements of the latch bolt and which is axially immobilized with respect to the housing that forms the stator, and a rear control rod which is mounted to slide axially with respect to the rotor, to which it is connected in terms of rotation, between a pulled back locked position and an extreme pushed forward unlocked position;

the radial flange for controlling the latch bolt retaining member belongs to the rear control rod;

the elastically deformable means for axially indexing the manual control member in its pulled back locked position and for holding it in this position collaborate with a portion of the rear control rod;

the electromagnetic member for immobilizing the control member in terms of rotation collaborates with the front rotor to immobilize it in terms of rotation;

the electromagnetic immobilizing member is an axially oriented electromagnet, the core plunger of which is urged elastically into the deployed position by a return spring in such a way as to be accommodated in at least one immobilizing notch formed in the rotor when the latter is in its angular position of rest, and this can be returned electromagnetically to the retracted position in such a way as to release the manual control member in terms of rotation;

the immobilizing notch is formed in an annular rear face of the rotor of the manual control member;

the electromagnetic immobilizing member and the initiating switch belong to a subassembly constituting a subassembly attached in the housing;

the attached subassembly comprises a printed circuit board which carries the switch and the electromagnetic immobilizing member;

the printed circuit board is in the shape of a flat annulus oriented transversely;

the printed circuit board is oriented axially;

the rear axial end of the control rod is connected in terms of axial translation and in terms of rotation to an operating knob.

Other features and advantages of the invention will become apparent from reading the detailed description which will follow, for an understanding of which reference will be made to the appended drawings, in which:

FIG. 4 is a view in part section, on an axial plane, of the antitheft system depicted in FIG. 3 and in which the control rod of the manual control member is in the pulled back position with the latch bolt in the deployed antitheft position;

FIG. 5 is a view in section on 5—5 of FIG. 4;

FIG. 6 is a view similar to that of FIG. 4, in which the latch boat is depicted in the pulled-in retracted position inside the housing with the control rod of the manual control member in the pushed forward position;

FIGS. 9 and 10 are views similar to those of FIGS. 7 and 8, in which the control rod of the manual control member is depicted in the pushed forward position and in the angular position of rest with the latch bolt in the deployed position for locking the steering column;

FIG. 11 and 12 are views similar to those of FIGS. 9 and 10 in which the control rod of the manual control member is depicted in the pushed forward position and in the angular operating position, with the latch bolt in the pulled in retracted position inside the housing and held in this position by the latch bolt retaining member which is in the active forward axial position;

FIGS. 13 and 14 are views similar to those of FIGS. 11 and 12, in which the control rod of the manual control member in the pushed forward position and in the angular position of rest, with the latch bolt in the pulled in position retracted inside the housing;

FIG. 21 is a perspective view on a larger scale depicting part of the rotor belonging to the manual control member of the antitheft system according to the second embodiment depicted in FIGS. 19 and 20.

Figure 1:
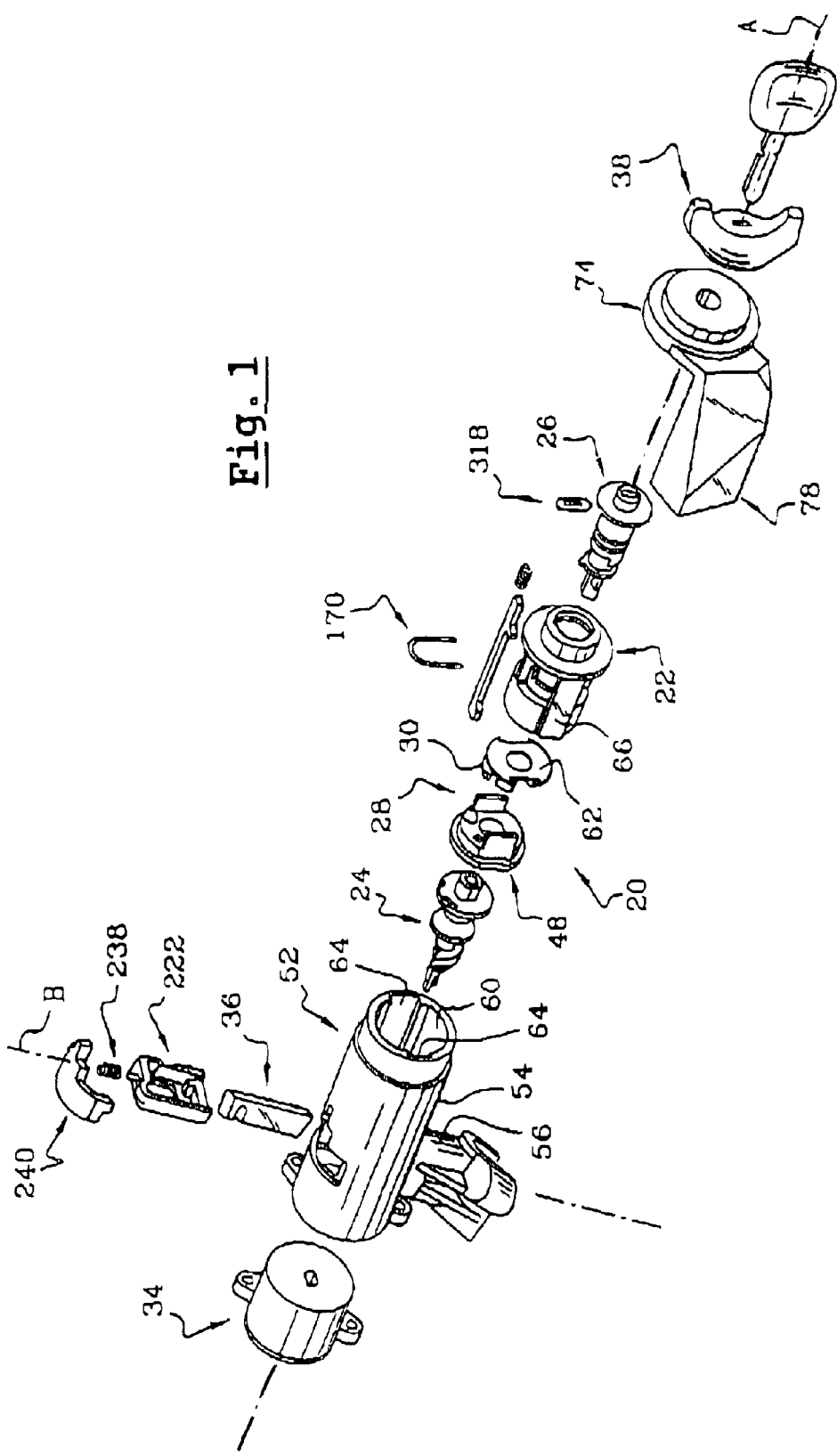
FIG. 1 is an overall three-quarters rear perspective exploded view of the main components of an antitheft system according to a first embodiment in accordance with the teachings of the invention.
Figure 2:
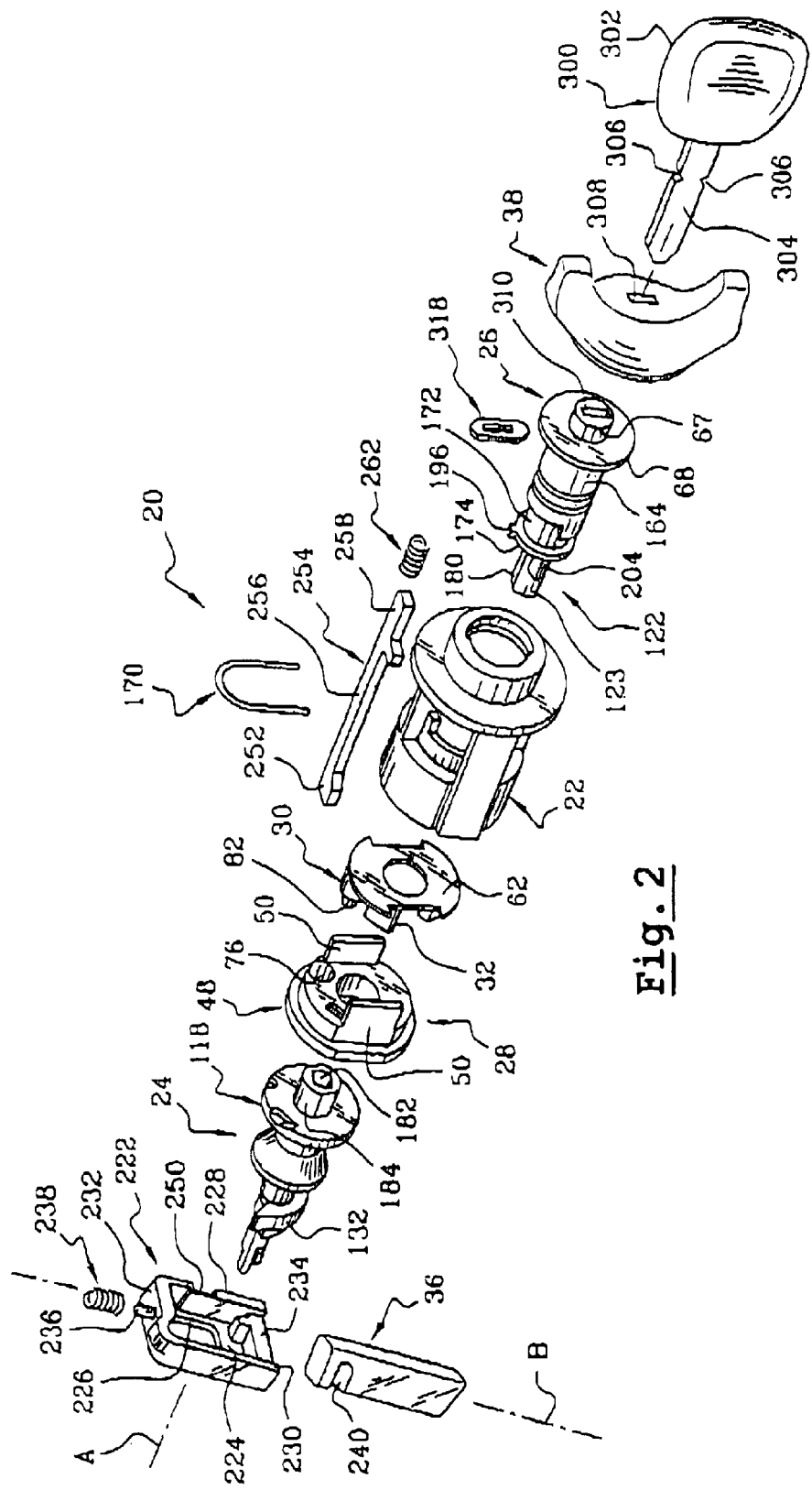
FIG. 2 is a view similar to that of FIG. 1, in which the components are depicted on a larger scale and in which certain components, particularly the elements of the antitheft housing, have not been depicted.

By convention, and without any implied limitations, a rear-to-front orientation along the overall axis A of the antitheft system will be adopted in the remainder of the description and in the claims, this being from right to left when considering FIGS. 1 and 2.

In the following description, identical, similar or analogous components and elements will be designated by the same reference numbers.

Figure 3:
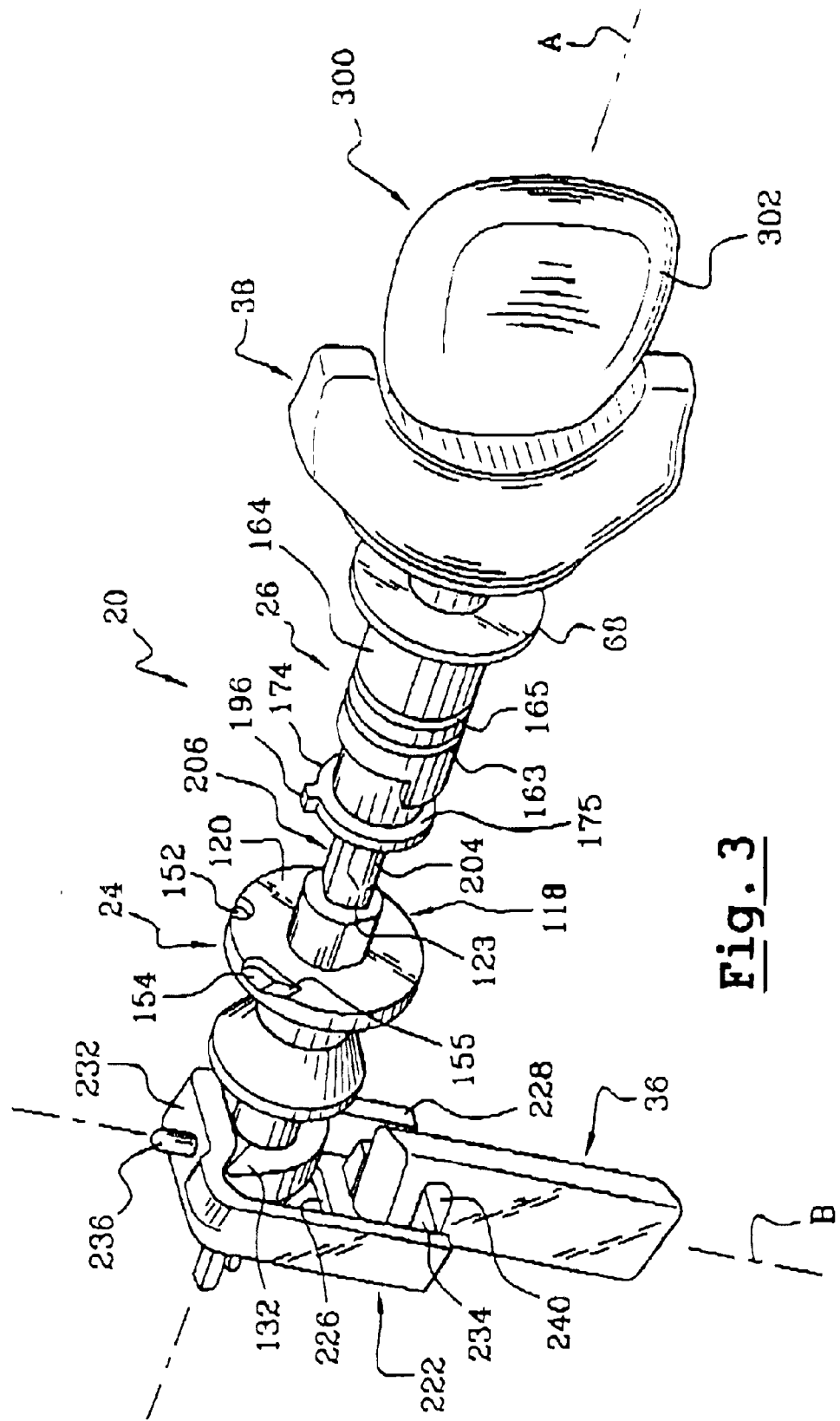
FIG. 3 is a view similar to that of FIG. 2, in which the various components are illustrated in the relative position that they occupy with respect to one another when the antitheft system is assembled and when the latch bolt is in the pulled-in retracted position.

As can be seen particularly in FIGS. 2 and 3, the antitheft system 20 according to the invention constitutes a particularly compact assembly that can easily be incorporated into a steering column assembly of known overall design, and particularly into a housing of known overall design and which is designed to accommodate an antitheft mechanism with a mechanical lock.

The antitheft system comprises a cast housing 52 in which is mounted the antitheft mechanism 20 which essentially consists of a stationary body or stator 22, of a two-part manual control member comprising a rotor 24 and a control rod 26, and of a stationary subassembly constituting a module 28 attached to the housing 52 and which, in particular, comprises a monostable electromagnet 30 and an electric switch 32.

The antitheft system also comprises a multi-position rotary interrupter 34 connected in terms of rotation to the front free end of the rotor 24, and a latch bolt 36 for immobilizing in terms of rotation a steering column shaft (not depicted) which is overall mounted to slide in the housing 52 in a radial or transverse direction B with respect to the overall axis A.

To manipulate it, the manual control member made in two parts 24 and 26 is associated with a rear manipulating knob 38 which is connected in terms of rotation and in terms of axial translation, in both directions, to the rear free end of the control rod 26 so as to drive the latter in rotation and in axial translation in both directions about and along the axis A with respect to the stationary stator 22.

The stationary stator 22 is a casting, for example in light alloy, which comprises a rear portion 40 of cylindrical annular overall shape, and a front portion 42 of the same shape, each of which internally delimits an internal bore 44 and 46 respectively. The rear bore 44 accommodates, in rotation and in axial sliding, the rear rod 26 of the manual control member while the front bore 46 delimits a cylindrical cavity, open axially toward the front, and which accommodates the module or cassette 28 of complementary overall shape.

More specifically, the body 48 of the cassette 28 is a casting of annular cylindrical overall shape having two opposed Lateral cheers 50 to be positioned and immobilized, angularly and axially, with respect to a transverse printed circuit board 62 which is a radially oriented flat annulus which in particular, on its transverse front face, carries electronic and/or electromechanical components, including the electric switch 32 and the electromagnet 30.

The electric switch 32 comprises a member controlling its initiation, which member is a spherical ball 70, the positioning of the switch 32 with its ball 70 being such that the ball projects radially overall toward the inside.

The electromagnet 30 is an axially oriented electromagnet with a stationary cylindrical body 72, the axis C of which is parallel to the axis A, but radially off-centered toward the outside with respect to the axis A.

The rear face of the body 72, with its electrical connections, is fixed to the transverse face of the board 62, while its body 72 extends into a complementary housing 76 of the body of the cassette, the end wall of which has an axial hole of smaller diameter to allow the passage in axial sliding of the output rod 82 of the electromagnet, which rod is connected to the moving core plunger thereof which comprises a return spring (not visible in the figures) which constantly urges it toward its deployed forward axial position see FIG. 4), that is to say when the coil of the electromagnet 28 is not electrically cowered.

The housing 52 is a light alloy casting which essentially consists of a tubular cylindrical body 54 of overall axis A and of another transverse body of tubular overall shape 56 of axis B, inside which the latch bolt 36 is guided in sliding in a passage 58 of a shape that complements that of the latch bolt so as to prevent any rotation of the latter about the axis B.

The internal bore 60 of the body 54 has two opposed longitudinal slots 64 for positioning and angularly indexing the stator 22, the body of which for this purpose has two complementary ribs 66.

All of the components of the antitheft mechanism 20 are held axially inside the body 52, 54 by a rear cover 74 which extends axially forward in the form of a lateral cap 78 which, in particular, makes it possible to accommodate the various electrical connections and couplings between antitheft system and the vehicle wiring loom.

The rear cover or cap 74 has passing through it, centrally, a rear free end portion 67 of the control rod 26, to which the control knob 38 is fixed for driving the control rod 26 in axial sliding and An rotation in both directions.

The control rod 26 has a rear radial flange 68, beyond which the main cylindrical portion 164 of the rod extends axially forward.

In order to index the control rod 26 axially with respect to the stator 22, in its two functional axial positions, namely the pulled position (FIG. 4) and the pushed position (FIG. 6), the portion 164 has two grooves, front 163 and rear 165 respectively, in each of which the opposed two branches 168 of an elastic indexing pin 170 housed in the stator 22 can be accommodated.

Beyond its large-diameter rear main portion 164, the body of the rod 26 continues axially forward in the form of a small-diameter intermediate portion 172, then in the form of an outer radial flange 174 comprising an angular indexing radial tab 196, and finally, in the form of a front free end portion 122 of cylindrical overall shape 123.

The portion 122 comprises a cam 204 in relief, connected to the cylindrical surface 123 by a front end ramp 206.

The front end portion 122 of the control rod 26 also has two flats 180 which are designed to be accommodated in a complementary housing 182 formed in the rear free end portion 184 of the rotor 24 to provide the rotational connection in both directions between the rod 26 and the rotor 24 while at the same time allowing the rod 26 to slide axially with respect to the rotor 24 which is immobilized in terms of axial translation in both directions with respect to the stator 22.

Figures 7, 8:
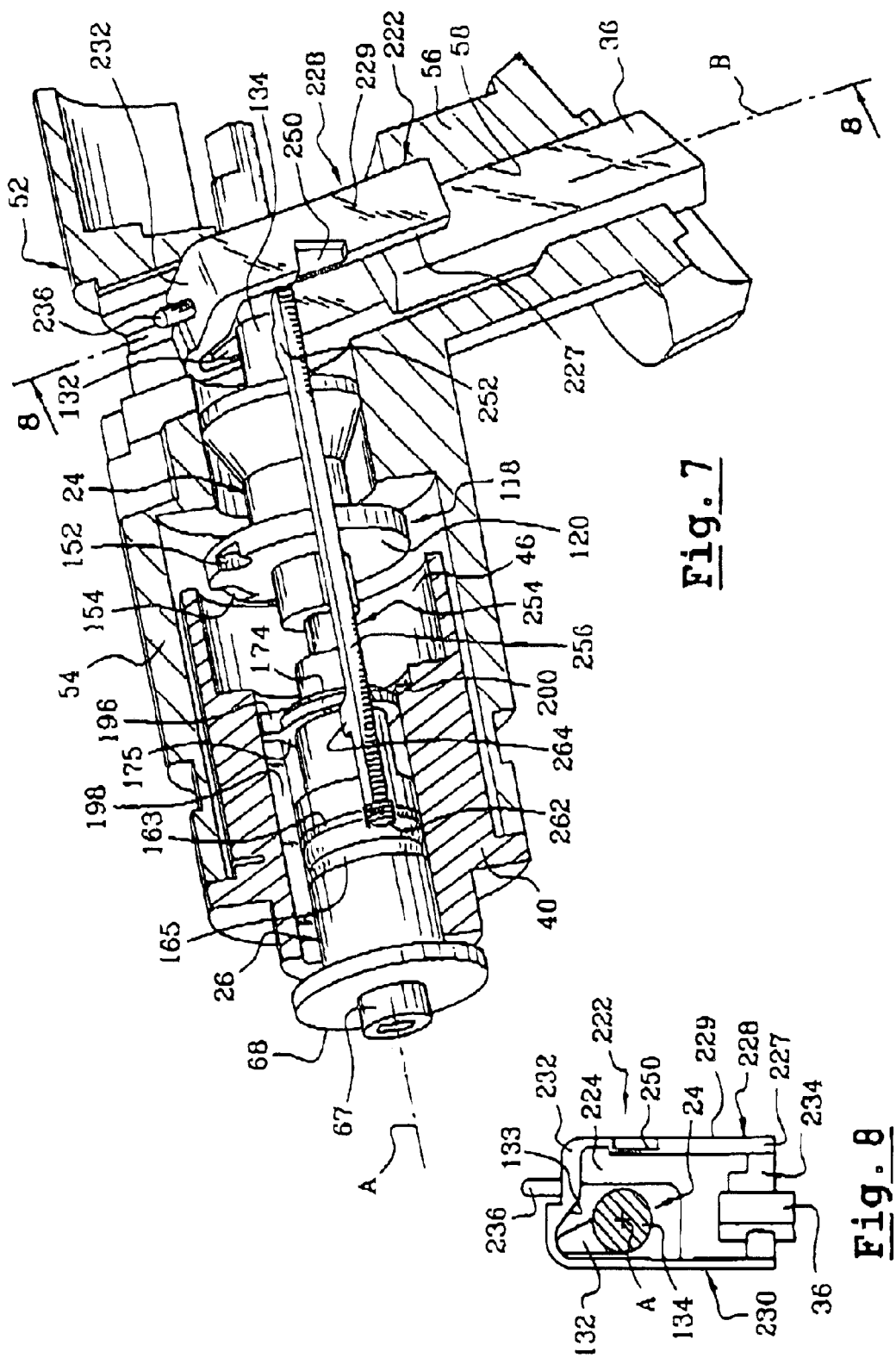
FIG. 7 is a perspective view, on a larger scale and in part section on an axial plane, illustrating the main components of the antitheft system depicted in FIGS. 1 to 6 in a state in which the latch bolt as in the deployed position for locking the steering column and the control rod of the manual control member is in the pulled back position.
FIG. 8 is a view in partial cross section on 8—8 of FIG. 7.

As car be seen in particular in FIG. 7, the rear portion 40 of the stator 22 comprises an axial slot 198 in which the angular indexing tab 196 is accommodated, in sliding, when the rod 26 is in the pulled back position.

The slot 198 opens axially forward toward the cavity 45 so that when the rod 26 is in the pushed forward position, the rod 26 with its indexing tab 196 can turn in both directions about the axis A, driving the rotor 24 in rotation with it.

When the rod 26 is in the pushed forward position, the indexing tab 196 is accommodated with rotation in a complementary groove 200 of the stator 22 (see in particular FIG. 9)

Beyond its rear free end portion 184, the rotor comprises an outer radial flange 118, the rear transverse face 120 of which has a first notch 152 which can accommodate the front free end of the rod 82 of the electromagnet 30 to immobilize the rotor 22 in terms of rotation.

The rear face 120 also comprises a second notch 154 which meets the rear face 120 at a slope 155 which can be overcome in one direction. In particular in the case of a vehicle with an automatic gearbox, the slope permits rotation to the ON and START positions. The notch prevents rotation from the ACCESSORIES position to the STOP position if, for example, the gear lever is not in the "PARK" position.

Near its front axial end, the rotor 24 has a cam 132 which controls he displacements of the latch bolt 36 and which is overall in the form of a radial finger which projects with respect to the front cylindrical portion 134 of the rotor 24.

The latch bolt 36 is associated, for controlling its displacements, with a puller 222 on which the cam 132 acts.

The puller 222 is a part of hollow rectangular parallelepipedal overall shape and comprises, in its transverse face or front end wall 224, an opening 226 through which the front portion of the rotor 24 passes for rotationally driving the interrupter 34.

The puller 222 has two lateral branches or sides 228 and 230, which are oriented radially parallel to the axis B and are joined together by an upper wall 232 and by a lower wall 234.

The upper side 232 comprises a peg 236 for centering a compression coil spring 238 which constitutes the return spring for the puller 222 and therefore for the latch bolt 36, to the antitheft deployed position, bearing against a part opposite belonging to the body 54 of the housing 52 which here consists of the internal face of an attached plug 240 which allows the latch bolt 36 and its puller 222 to be fitted radially along the axis B in the body 56 of the housing 52 (see FIG. 1)

As can be seen particularly in FIGS. 8, 10, 12 and 14, the finger forming a cam 132 collaborates with the internal profile 133 opposite forming a ramp and formed in the radially interior surface of the upper wall 232 of the puller 222.

For driving the latch bolt 36, the latter comprises, near its radially interior end, a notch or slot 240 in which the lower wall 234 of the puller 222 is accommodated so that these two elements are connected in terms of translation in both directions along the axis S.

As can be seen in particular in FIGS. 4, 6 and 7, the lateral side 228 of the puller 222 is delimited by a flat external face 229 and by a rear transverse face 227 which are both oriented radially and are mutually perpendicular.

According to the teachings of the invention, a notch 250 for retaining the latch bolt 36 in the pulled in retracted position is formed in the puller 222 and more precisely in its lateral side 228.

The notch 250 is open axially toward the rear, that is to say that it opens into the rear transverse face 227 of the Bide 228 and opens also laterally toward the outside in the face 229 of the lateral side 228.

The notch 250 is designed to accommodate the front free end 252, forming the retaining finger for the latch bolt 36–222, of an axially oriented bar 254 which constitutes the latch bolt retaining member within the meaning of the invention.

The bar 254 is a cut-out sheet metal component of elongate overall shape of which the body 256, in the shape of a flat rod, is mounted to slide axially in the stator 22 (see FIG. 5).

The rear axial end 258 of the bar 254, 256 is accommodated in axial sliding in a complementary housing 260 of the stator 22 with the interposition of a compression coil spring 262 which bears against the rear axial end wall of the housing 262 to constantly urge forward the member 254 for retaining the latch bolt 222, 36, that is to say to urge it in the direction for immobilizing the latch bolt in the in position.

Near its rear axial end 258, the flat rod 256 comprises a tab 264 for controlling its displacement between the two extreme axial positions that it is capable of occupying and which are depicted respectively in FIGS. 4 and 6.

The tab 264 extends radially toward the axis A in the housing corresponding to the small-diameter intermediate portion 172 of the control rod 26.

Under the action of the spring 262, the control tab 264 constantly presses axially forward against the transverse rear face 175 of the radial flange 174 of the control rod 26.

Thus, when the control rod 26 is in its pulled back position depicted in particular in FIG. 4, the latch bolt retaining member 254 is in the effaced rear axial position, against the action of its return spring 262, and its front free end 252 forming the latch bolt retaining finger is situated outside the notch 250 and facing the transverse rear face 227 of the lateral side 228, with a functional axial clearance with respect to the latter.

By contrast, as can be seen in FIG. 6, the finger 252 can be accommodated axially in the notch 250 of the puller 222, associated with the latch bolt 36, to hold these two elements radially toward the inside in the housing 52, 56.

In this active forward axial position of the latch bolt retaining member 252, the latch bolt is immobilized in terms of translation along the axis B and the steering column shaft is thus free to turn.

The axially forward active position of the latch bolt retaining member 254 is determined by the pushed forward position of the control rod 26, which is axially indexed in this position with respect to the stator 22 by the pin 170 accommodated in the groove 163.

Because of the axial guidance of the bar 154 in the body of the stator 22, there is no risk of the finger 252 accidentally escaping from the notch 250, regardless in particular of the vibrations to which the antitheft mechanism is subjected as the vehicle travels along.

The rating of the return spring 262 and of the elastic pin 170 are such that the latter retains the control rod 26 in its pulled back axial position in spite of the force applied by the spring 262 to the member 254 and therefore in spite of the force applied by the control tab 264 to the control rod 26 in collaboration with the rear transverse face 175 of the flange 174.

According to one aspect of the invention, a back-up transponder may be provided, this here being in the form of an emergency "key" 300, the head 302 of which houses the transponder (not depicted) and is extended axially forward in the form of a flat key shank 304 which, about mid-way along its length, has two opposed radial notches 306.

The key shank 304 is designed to be taken axially through a first slot 308 formed in the knob 38 and inside a complementary slot 310 formed in the rear part of the body of the control rod 26, as can be seen in particular an FIGS. 15 to 18. The snot 310 for this purpose opens axially backward.

The large-diameter portion 164 of the body of the control rod 26 has a radial slot 312 which opens radially at its two opposite ends and which is delimited by two opposed lateral faces 34.

The slot 312 thus constitutes a slideway in which a tumbler 318 for axially immobilizing the emergency key 300 9s received in sliding.

Figure 16:
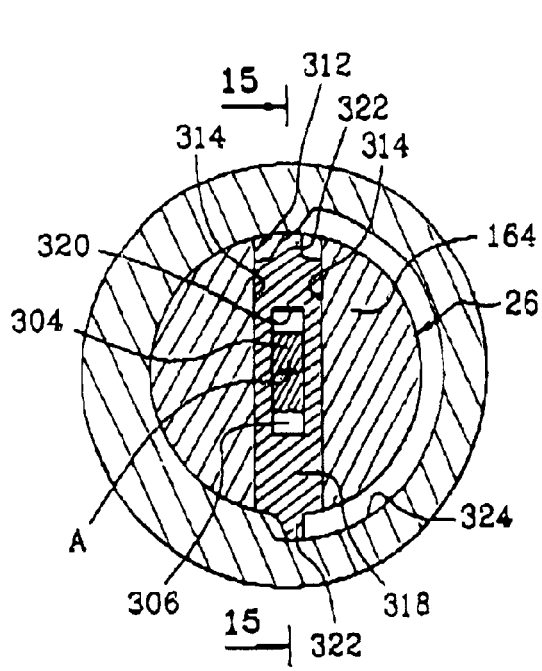
FIG. 16 is a sectioned view in cross section on 16—16 of FIG. 15.
Figure 15:
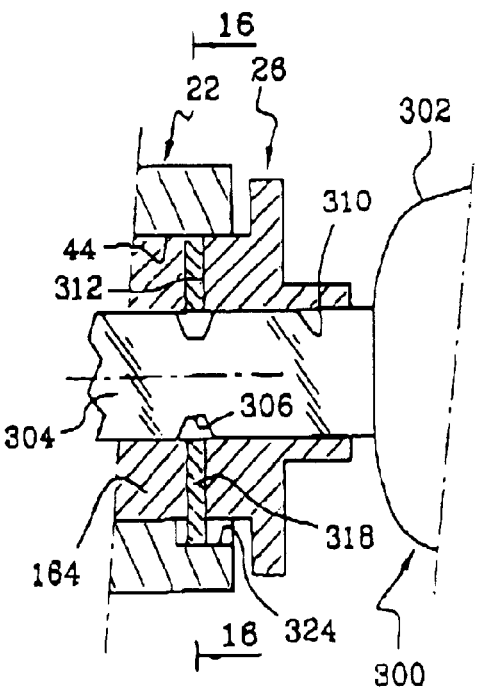
FIG. 15 is a detail view on a larger scale, in section on an axial plane on 15—15 of FIG. 16, illustrating the means of retaining the emergency "key" which is depicted in a position introduced axially into the body of the control rod, the latter being in the angular position of rest.
Figure 18:
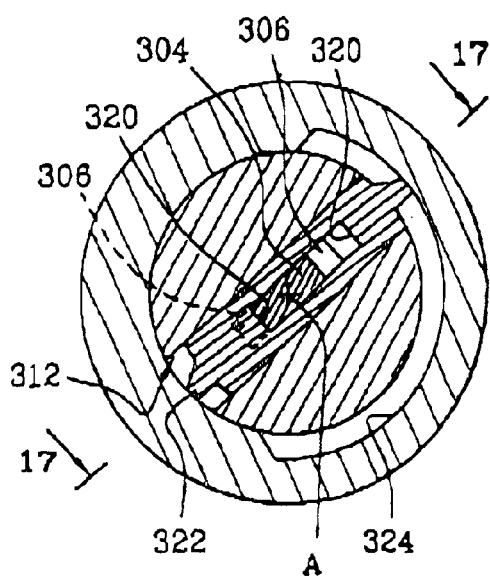
FIGS. 17 and 18 are views similar to these of FIGS. 15 and 16 in which the key is illustrated in a position introduced into and held axially in the body of the control rod, the latter being depicted in the "ACCESSORIES" angular position.

For this purpose, according to an overall design that is known in the field of barrel or cylinder locks, the central part of the body of the tumbler 318 has a rectangular opening 320 which, when the control rod 26 is in its angular position of rest depicted in FIGS. 15 and 16, allows the emergency key, that is to say the shank 304, to be introduced into the slot 310 axially and extracted axially therefrom.

The tumbler 318 is positioned radially in this angular position of rest because of the collaboration of its two radial end fingers 322 which collaborate with a complementary cam profile 324 formed opposite in the rear internal bore 44 of the stator 22.

Figure 17:
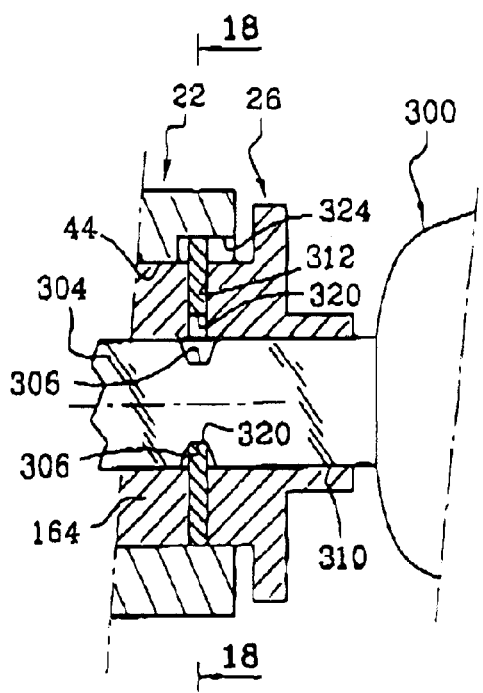

By contrast, when the control rod 26 leaves its angular position of rest to occupy another position, turning in the clockwise direction when considering FIGS. 16 and 17, the cam profile 324 causes the tumbler 318 to move radially in the slot 312, so that the lower edge of the opening 320 is accommodated in the lower notch 306 of the shank 304 of the emergency key 300, which is thus axially immobilized with respect to the control rod 26, and therefore with respect to the stator 22 in so far as, in such an angular position other than the angular position of rest, the control rod 26 is itself axially immobilized with respect to the stator 22.

When the vehicle is in use, whether this relates to the "+ACCESSORIES", to the "+ CONTACT" or to the "START" position, the back up transponder is thus always axially near a backup antenna (not depicted) which is incorporated into the stator 22 near the rear end thereof, or alternatively into the cover 74.

When the control rod 26 is returned angularly to its position of rest illustrated in FIGS. 15 and 16, under the action of the cam profile 324 which pushes the tumbler 318 back, it is then once again possible to extract the emergency key 300 axially.

Because of its shape and ergonomics, the head 302 of the emergency key 300 constitutes, with the control knob 38, the member for grasping and manipulating the control rod 26 and the rotor 24.

Of course, means (not depicted) are provided for determining two extreme angular positions of the rotor 24 with respect to the stator 22, corresponding to its angular position of rest and to the "START" position, as well as elastic means for returning the rotor 24 to the "+ CONTACT" position (also known as the "ON" position) once the starter has been operated.

When the control rod 26 is in its pushed or depressed axial position and the rotor is in its extreme axial angular position of rest or stop position illustrated in FIG. 6, the ramp 206 collaborates with the ball 70 to urge it radially outward, bring it onto the cylindrical bearing surface 204 and thus actuate the switch 32.

By contrast, when the rotor is in the same angular position, and if the knob 38 and the control rod 26 are pulled axially back, the ramp 206 retreats axially backward and no longer acts on the ball 70 of the switch, which once again changes switching state (FIG. 4).

Thus, pushing in or pulling the rod 26 (which are possible only in the extreme angular position of rest or "STOP" position) causes a change of state of the switch 32 which results in the production of a signal sent to the electronic circuit carried by the printed circuit board 62.

In the same way, when the rod 26 is in its pushed in forward extreme axial position with respect to the rotor 24 and the latter is rotated with respect to the stator 22, leaving the extreme angular "STOP" position, another change in state of the switch 32 is brought about, this being by acting on the ball 70 which also in this case constitutes the member for initiating the swatch 32.

Thus, when the rotor leaves its extreme angular position of rest (after the electromagnet 30 has been operated to this effect in order to retract the rod 82 from the notch 152 when the user has been identified as being an authorized user) so that it can turn under the action of the knob 38, the switch chances state and therefore causes the rod 82 to be released, which rod comes to rest axially against the periphery opposite belonging to the rear transverse face 120.

The rotor can then, for example, reach its other extreme angular position "START" corresponding to actuation of the starter and then return to an on position under the action of the spring, not depicted, that angularly returns the rotor. As long as the rod 82 is not retracted backward by the powering of the electromagnet 30, it is impossible for the rotor to be returned to its extreme angular stop position, because of the presence of the notch 154.

For this purpose, during the return travel, the cam 204 acts on the ball 70 and on the switch 32 which, after a time delay, causes power to be applied to the electromagnet and therefore causes the rod 82 to be effaced so that the extreme angular position "STOP" can once again be reached.

This withdrawal of the rod 82 is possible only after the user's electronic identifier code has been verified.

The means for exchanging and verifying the identifier code are not depicted and are of a generally known design, whether this be a transponder associated with an antenna of the vehicle, worn or carried by the driver in the case of a system known as a "hands-free" antitheft system, or introduced into a reader onboard the vehicle.

In order to obtain such immobilization of the steering column shaft in terms of rotation, the user pulls the knob 38 and the control rod 26 axially back, which once again causes a change n state of the switch because the ball leaves the surface 204 and "drops" radially. This change in state allows the rod 82 to be released once again and this rod axially enters the notch 152 backward. This deliberate withdrawal of the "key" 39-26 therefore causes rotational immobilization of the rotor 24 of the manual control key 38-24-26 and release of the latch bolt 36 which rotationally immobilizes the steering column.

When the knob is pushed in again with a view to releasing the steering column and with a view therefore to allowing the rotor 24 to rotate, this rotor taking with it the cam 132 controlling the latch bolt 36 and driving the rotary interrupter 34, the action on the ball 70 gives rise to interrogation of the identifier by the electronic antitheft system with a view to verifying that the code received from the identifier by the electronic antitheft circuit is correct, then causes power to be applied to the electromagnet 30, the application of power to which is made possible by the electronic circuit carried by the board 62 which has received a signal indicating that the code is correct.

The way in which the means for retaining the latch bolt 36-222 comprising the bar 354 in association with the control rod works is more particularly illustrated by the successive pairs of FIGS. 7–8, 9–10, 11–12 and 13–14.

The second embodiment illustrated in FIGS. 19 to 21 will be now be described, this being essentially by comparison with the first embodiment.

Figure 19:
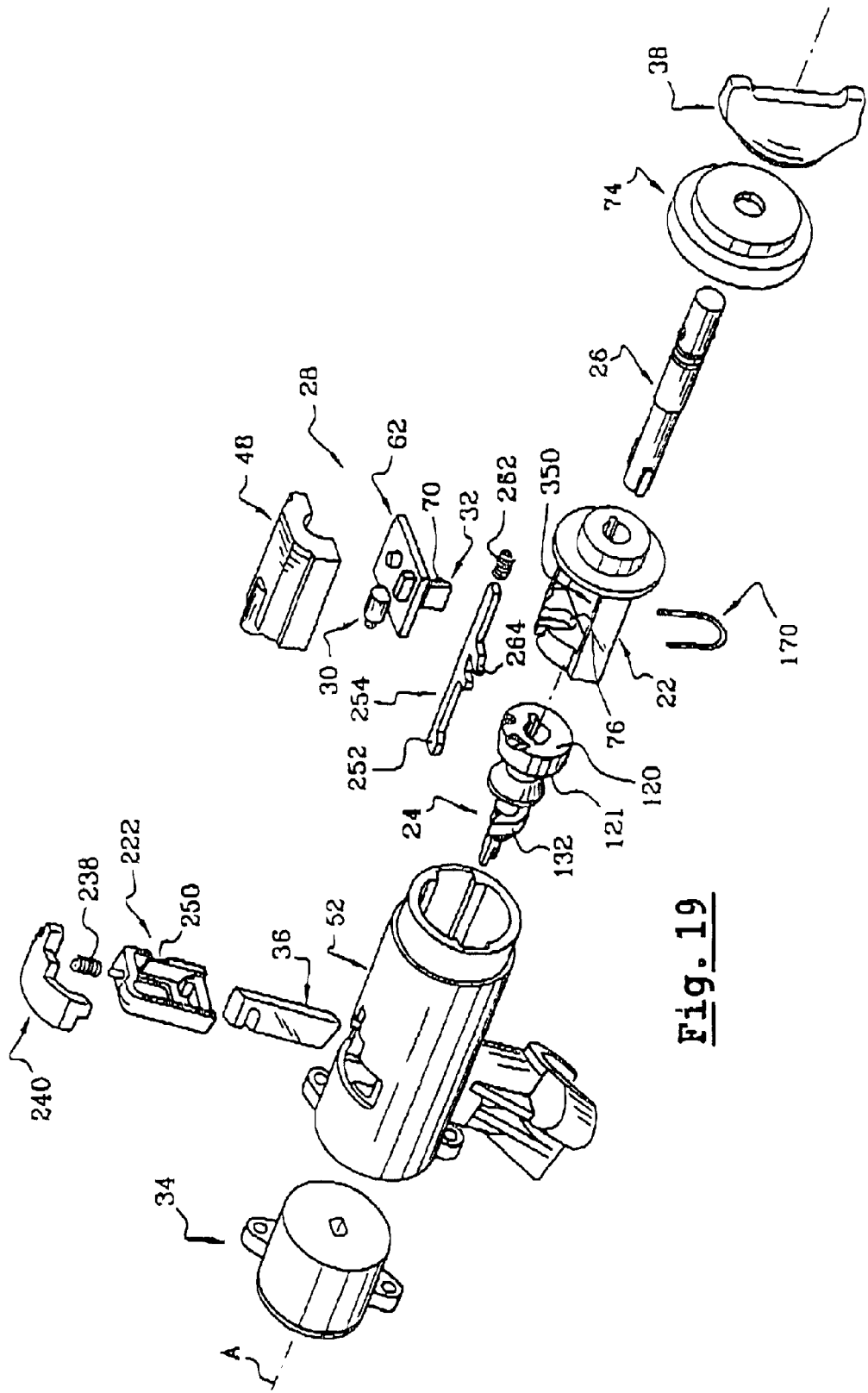
FIG. 19 is a view similar to that of figure illustrating a second embodiment of an antitheft system according to the teachings of the invention.

It can be seen first of all in FIG. 19 that the module 28 comprising the printed circuit board 62 that carries the electromagnet 30 and the switch 32 is here oriented axially and accommodated in a complementary cavity 350 of the stator 22, the front axial end part of which has a passage 76 for the electromagnet 30. The board 62 is held in the housing 350 by a cast body 48 so as to form an attached module 28 similar to the one described previously.

As regards the manual control member consisting of the association of the rod 26 and of the rotor 24, it may be seen that the flange 118 of the rotor 24 is axially thicker over a given angular sector of its circumference, being delimited by the rear transverse face 120 and by a front transverse face 121 which continues in the form of a slope 122 to reach a portion 123, offset axially backward, which with the face 120 delimits an angular sector of smaller axial thickness of the flange 118.

The latch bolt retaining bar 254 comprises, apart from its control tab 264, a radial safety tab 265 which is axially offset forward with respect to the control tab 264 to delimit therewith a notch 263 in which the thicker angular sector 120–121 of the flange 118 can be accommodated in rotation.

To control the axial displacements of the bar 254, the control rod 26 comprises a radial tab 196 which, as before, collaborates with the control tab 264 of the latch bolt retaining bar 254.

The thicker angular portion 120–121 of the flange 118 constitutes, when accommodated in the notch 263, a safety feature that prevents backward axial retreat of the bar 254, that is to say prevents any accidental release of the latch bolt 36 so as to avoid any inadvertent immobilization of the steering column when the vehicle is traveling along. The slope 122 ensures positive engagement of the bar 254 in its housing 222 in the event of the spring 262 becoming jammed.

Figure 20:
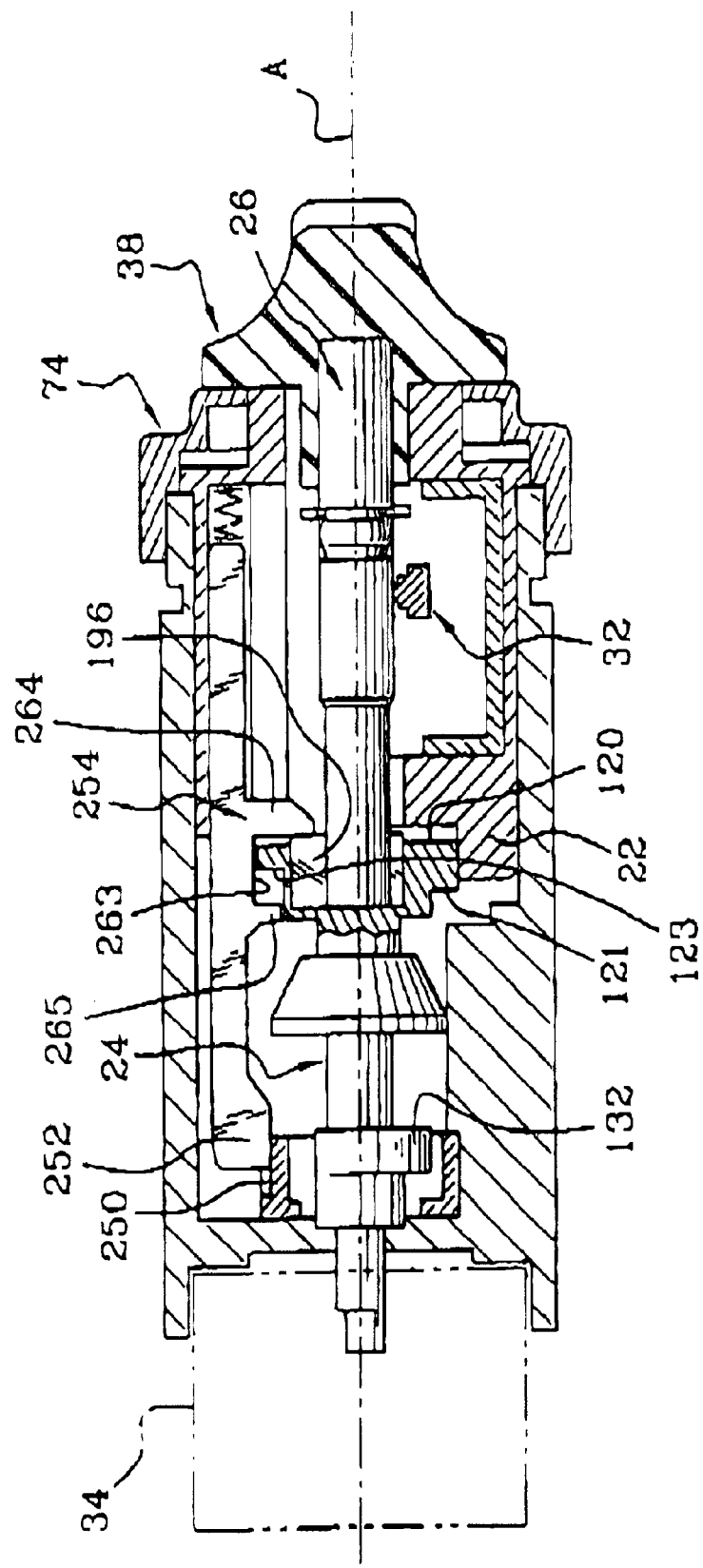
FIG. 20 is a view similar to that of FIG. 6, illustrating the relative position of the main components of the second embodiment of the antitheft system depicted in FIG. 19.

In contrast, when the rotor 24 with the control rod 26 is in its angular position of rest illustrated in FIG. 20, it is the thinner angular portion 120–123 of the flange 118 that is accommodated in the notch 263 and it is therefore possible to shift the latch bolt retaining bar 254 axially in both directions, particularly in order to allow the latch bolt 36-222 to be released by pulling on the control knob 38, or in order to allow the ant,theft system to be reset by once again pushing the snob 38 axially forward.

Finally, in this second embodiment, it will be noted that no possibility of combining an emergency key with the antitheft system is envisaged.

What is claimed is:

1. A motor vehicle antitheft system of the type comprising an antitheft mechanism comprising a housing in which a manual control member for manually controlling the starting of the vehicle engine and the locking of the vehicle steering column:
    is mounted so that it can move axially between a pulled back locked position in which it locks the steering column and a pushed forward position in which it unlocks the steering column;
    is mounted so that it can rotate between at least one angular position of rest and one angular position of use in which it cannot be pulled axially back;
    and is connected in terms of rotation to a rotary output member forming a cam which is capable of collaborating with a latch bolt to control the movements of the latter which is mounted to slide in the housing in a direction which is radial overall with respect to the axis of rotation of the manual control member between a deployed radially outward antitheft position toward which it is elastically urged and in which it projects through an opening of the housing to immobilize in terms of rotation a member of the steering column when the manual control member is in the angular position of rest and in the pulled back locked position, and a pushed-in position retracted inside the housing when the manual control member is in the pushed forward position, and of the type in which:
        the latch bolt is held radially in the pulled-in retracted position by a latch bolt retaining member for retaining the latch bolt which is mounted to move between an effaced or retracted position and an active position of retaining the latch bolt, toward which position it is elastically urged and in which a retaining finger belonging to the latch bolt retaining member is accommodated in a complimentary notch in the latch bolt,
    said system further comprising elastically deformable means for axially indexing the manual control member in its pulled back locked position and for retaining the manual control member in said pulled back locked position against a return force exerted on the latch bolt retaining member by a return spring;
        wherein the member for retaining the latch bolt is mounted to slide in the housing parallel to the axis of displacement and of rotation of the manual control member, and wherein the finger for retaining the latch bolt is formed at the front free end of the latch bolt retaining member;
        and wherein the displacement of the latch bolt retaining member toward its effaced rear axial position against said return spring is controlled by the backward axial displacement of the manual control member into its pulled back locked position.

2. The antitheft system as claimed in claim 1, wherein a portion of the latch bolt located inside the housing has a transverse rear face in which said latch bolt retaining notch is formed which is open axially toward the rear and in which the finger for retaining the latch bolt can be accommodated.

3. The antitheft system as claimed in claim 2, wherein, when the steering column is in the locked position, the front free end of the latch bolt retaining member extends facing said rear transverse face.

4. The antitheft system as claimed in claim 1, wherein the manual control member comprises a radial flange, the rear annular face of which collaborates with a control tab of the latch bolt retaining member which extends radially inward facing this annular face.

5. The antitheft system as claimed in claim 4, wherein the manual control member has a tab for axially retaining the manual control member with respect to the housing that forms a stator, which extends radially outward from the peripheral edge of said flange and which is accommodated in axial sliding in a complementary slot belonging to the housing to allow the axial displacements of the manual control member between its two axial positions, namely its pulled back locked position and its pushed forward unlocked position.

6. The antitheft system as claimed in claim 5, and which comprises:

a motorized immobilization member, particularly an electromagnetic member, for immobilizing in terms of rotation the control member with respect to the housing and the release of which is brought about when a coded antitheft signal is furnished by an identification unit to an electronic circuit for controlling the immobilization member;

and a switch for initiating an interrogation and identification step, which is carried by the housing and which is initiated by the manual control member.

7. The antitheft system as claimed in claim 6, wherein the manual control member comprises a front rotor which is mounted to rotate with respect to the housing forming a stator between two extreme angular positions, one of which corresponds to said angular position of rest, which controls the displacements of the latch bolt and which is axially immobilized with respect to the housing that forms the stator, and a rear control rod which is mounted to slide axially with respect to the rotor, to which it is connected in terms of rotation, between a pulled back locked position and an extreme forward unlocked position.

8. The antitheft system as claimed in claim 7, wherein said radial flange for controlling the latch bolt retaining member belongs to the rear control rod.

9. The antitheft system as claimed in claim 7, wherein said elastically deformable means for axially indexing the manual control member in its pulled back locked position and for holding it in this position collaborate with a portion of the ear control rod.

10. The antitheft system as claimed in claim 9, wherein the immobilization member for immobilizing the control member in terms of rotation collaborates with the front rotor to immobilize it in terms of rotation.

11. The antitheft system as claimed in claim 10, wherein the immobilization member is an axially oriented electromagnet, the core plunger of which is urged elastically into the deployed position by a return spring in such a way as to be accommodated in at least one immobilizing notch formed in the rotor when the latter is in its angular position of rest, and wherein this can be returned electromagnetically to the retracted position in such a way as to release the manual control in terms of rotation.

12. The antitheft system as claimed in claim 11, wherein the immobilizing notch is formed in an annular rear face of the rotor of the manual control member.

13. The motor vehicle antitheft system as claimed in claim 12, wherein the immobilization member and the initiating switch belong to a subassembly constituting a subassembly attached in the housing.

14. The antitheft system as claimed in claim 13, wherein the attached subassembly comprises a printed circuit board which carries said switch and the immobilization member.

15. The antitheft system as claimed in claim 14, wherein the printed circuit board is in the shape of a flat annulus oriented transversely.

16. The antitheft system as claimed in claim 14, wherein the printed circuit board is oriented axially.

17. The antitheft system as claimed in claim 7, wherein the rear axial end of the control rod is connected in terms of axial translation and in terms of rotation to an operating knob.

* * * * *